United States Patent [19]

D'Luna

[11] Patent Number: 5,177,704

[45] Date of Patent: Jan. 5, 1993

[54] MATRIX TRANSPOSE MEMORY DEVICE

[75] Inventor: Lionel J. D'Luna, Rochester, N.Y.

[73] Assignee: Eastman Kodak Company, Rochester, N.Y.

[21] Appl. No.: 691,793

[22] Filed: Apr. 26, 1991

Related U.S. Application Data

[63] Continuation of Ser. No. 488,822, Feb. 26, 1990, Pat. No. 5,042,007.

[51] Int. Cl.[5] .......................... G11C 8/04; G11C 7/00
[52] U.S. Cl. ................................ 365/78; 365/189.02; 365/189.12; 365/230.02; 365/230.03
[58] Field of Search ................ 365/78, 189.01, 189.02, 365/189.4, 189.12, 230.02, 230.03, 233, 51, 63

[56] References Cited

U.S. PATENT DOCUMENTS

| | | | |
|---|---|---|---|
| 4,320,466 | 3/1982 | Myers | 395/775 |
| 4,592,019 | 5/1986 | Huang et al. | 365/189.04 |
| 4,751,675 | 6/1988 | Knauer | 365/78 |
| 4,845,669 | 7/1989 | Chappell et al. | 365/51 |
| 4,918,527 | 4/1990 | Penaro et al. | 365/189.04 |

FOREIGN PATENT DOCUMENTS

0286356 10/1988 European Pat. Off.
0319430 6/1989 European Pat. Off.

OTHER PUBLICATIONS

Mattausch et al., "A Memory-Based High-Speed Digital Delay Line With a Large Adjustable Length", IEEE Journal of Solid-State Circuits, vol. 23, No. 1, Feb. 1988.

Ruetz et al., "Architectures and Design Techniques for Real-Time Image-Processing IC's", IEEE Journal of Solid-State Circuits, vol. sc-22, No. 2, Apr. 1987.

Weste, Neil et al., "Principles of CMOS VLSI Design" Oct. 1985 pp. 204-206.

Zehner et al., "A CMOS VLSI Chip for Filtering of TV Pictures in Two Dimensions", IEEE Journal on Solid-State Circuits, Vol. sc-21 No. 5, Oct. 1986.

"Random-Access Memory Buffer for Bidirectional Serial Printer", IBM Technical Disclosure Bulletin, vol. 20, No. 5, Oct. 1977, pp. 1798-1800.

Primary Examiner—Joseph L. Dixon
Assistant Examiner—Jack A. Lane
Attorney, Agent, or Firm—Parkhurst, Wendel & Rossi

[57] ABSTRACT

A digital storage device is provided that includes a storage unit having a plurality of word storage locations, each of the word storage locations being coupled to a corresponding read enable line and write enable line, and a pointer unit for addressing the read enable lines and the write enable lines to permit data to be written into the word storage locations in a first sequence in a first operating mode and to be retrieved from the word storage locations in a second sequence that is transposed from the first sequence in a second operating mode; and a clock generator coupled to the pointer unit which controls the operation of the pointer unit.

5 Claims, 6 Drawing Sheets

|   |   |   |   |
|---|---|---|---|
| 1 | 2 | 3 | 4 |
| 5 | 6 | 7 | 8 |
| 9 | 10 | 11 | 12 |
| 13 | 14 | 15 | 16 |

*FIG. 6*

MATRIX TRANSPOSE MEMORY DEVICE

This is a continuation of application Ser. No. 07/488,822 filed Feb. 26, 1990, now U.S. Pat. No. 5,042,007.

BACKGROUND OF THE INVENTION

The present invention is generally related to digital storage devices. In particular, the present invention is related to digital storage device, such as a last-in first-out buffer (LIFO), in which data is written in a first sequence and read out in a second sequence that is transposed from the first sequence.

A first-in-first-out (FIFO) device requires that data be stored and then read out in the sequence in which it was stored. A FIFO can be utilized to provide a video line delay in digital image processing circuitry, as the first value read out from the FIFO is obtained only after all of the data has been sequentially stored in the FIFO. For example, a full video line delay is provided if the number of storage locations in the FIFO is matched to the number of pixels to be stored from the video line. Data representative of a first pixel is not retrieved from the FIFO until the data for the last pixel has been stored in the FIFO resulting in a one line delay.

The most common architecture of a FIFO is that of a shift-register which shifts data from one register to the next until the data is output after traveling the length of the FIFO. Shift-registers, however, require a good deal of chip space and power, especially when employed in digital image processing applications where the line length may require between 570 to 768 storage locations. Another disadvantage of a shift-register FIFO is that variable or programmable line lengths are not practically feasible, as the output of all the registers would have to be multiplexed to the output of the FIFO.

A better approach to a FIFO architecture is illustrated in copending application entitled "Memory Based Line-Delay Architecture", U.S. application Ser. No. 07/488,824 now U.S. Pat. No. 5,058,065, filed concurrently with the present application, which discloses a memory based line delay architecture that employs a pointer unit to sequentially address a plurality of word storage locations in a storage unit. The pointer unit is composed of one bit shift registers that shift a "travelling 1" along the length of the pointer unit to address read enable and write enable lines coupled to the word storage locations. The one bit shift registers are resettable to permit the length of the line delay to be varied. The FIFO architecture requires a minimum of chip space, has low power requirements, is programmable in length, and is flexible to permit changes in aspect ratio.

In some situations, it is desirable to retrieve information from a storage device in a sequence that is transposed from the sequence in which data was stored in the storage device, namely, in a LIFO mode of operation starting with the last word of data that was stored and progressing to the first word of data that was stored. The architecture disclosed in the above-described copending application, however, is limited to a FIFO mode of operation. Thus, it would be desirable to provide a device architecture having the advantages of the FIFO architecture described above that could also be used in a transpose mode of operation, and in particular in a LIFO mode of operation.

SUMMARY OF THE INVENTION

The present invention provides a digital storage device architecture in which data can be written in a first sequence and retrieved in a second sequence that is transposed from the first sequence. In addition, the digital storage device requires a minimum of chip space, has low power requirements, and is variable in length.

In particular, a digital storage device architecture is provided that includes a storage unit having a plurality of word storage locations, each of the word storage locations being coupled to a corresponding read enable line and write enable line, and a pointer unit for addressing the read enable lines and the write enable lines to permit data to be written into the word storage locations in a first sequence in a first operating mode and to be retrieved from the word storage locations in a second sequence that is transposed from said first sequence in a second operating mode; and a clock generator coupled to the pointer unit which controls the operation of the pointer unit.

Other features and advantages of the invention will become apparent after reviewing the detailed description of the preferred embodiments set forth below.

BRIEF DESCRIPTION OF THE DRAWINGS

With the above as background, reference should now be made to the following detailed description of the preferred embodiments and the accompanying drawings in which:

FIG. 6 illustrates a 4×4 matrix of data words to be stored and retrieved from the device illustrated in FIG. 5.

DETAILED DESCRIPTION OF THE PREFERRED EMBODIMENTS

Figure 1:
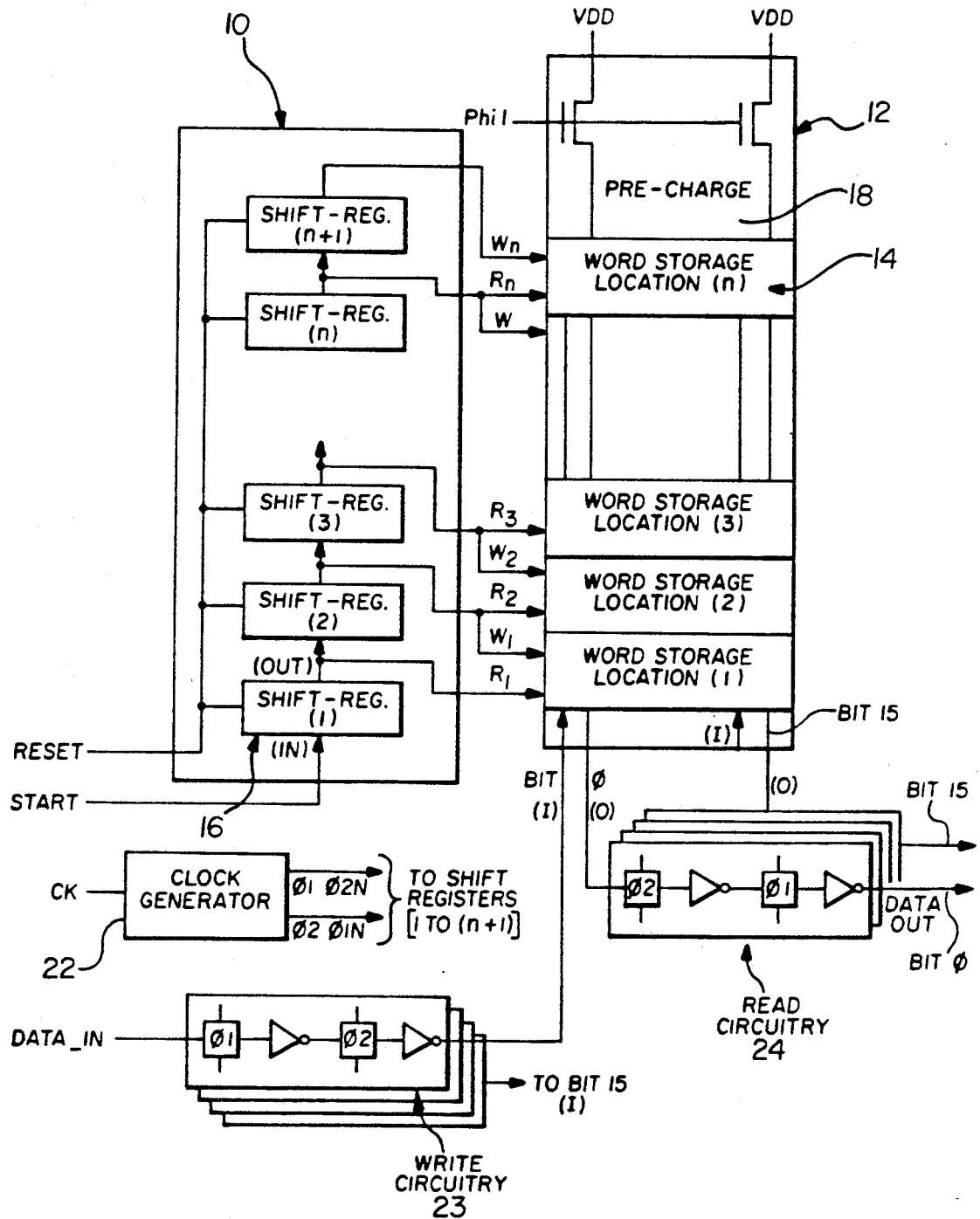
FIG. 1 is a simplified schematic diagram of a memory based FIFO architecture.

A simplified schematic diagram of a basic FIFO architecture as described in copending application "Memory Based Line-Delay Architecture", Ser. No. 07/488,824 now U.S Pat. No. 5,058,065 filed concurrently with the present application, is illustrated in FIG. 1. The FIFO includes a pointer unit 10 and a storage unit 12. The storage unit 12 includes a plurality of word storage locations 14, each of which contains sixteen memory cells. Each word storage location 14 is used to store one data word, with each memory cell storing one bit of the data word. A separate read enable (R) and write enable (W) line is supplied to the plurality of word storage locations within the storage unit 12. Data input bit-lines (I) and data output bit-lines (O) are coupled to the storage unit 12. The input and output data-bit lines are common to corresponding memory cells within a give video line store. For example, data input bit-line (bit 0) is connected to the lowest order memory cell in each word storage location of the storage unit 12.

The pointer unit 10 consists of a plurality of one bit shift-registers 16 and is used to sequentially address the word storage locations 14 of the storage unit 12. Each of the one bit shift-registers 16 includes an input line and an output line. The input line of a first shift-register (1) of the plurality of shift-registers 16 is connected to a control input line (START), which will be described in greater detail below, and the output of the first shift-register (1) is connected to the read enable line (R1) of a first word storage location (1) of the plurality of word storage locations 14, the output line of a last shift-register (n+1) of the plurality of shift-registers is connected to the write enable line (Wn) of a last word storage location (n), and shift-registers intermediate between the first shift-register and the last shift-register—shift-registers (2) through (n−1)—are connected such that the output line of a preceding shift register is connected to the input line of a successive shift-register, and the output of each intermediate shift register is connected to the read enable line of a corresponding word storage location and to the write enable line of a word storage location preceding the corresponding word storage location.

Figure 2:
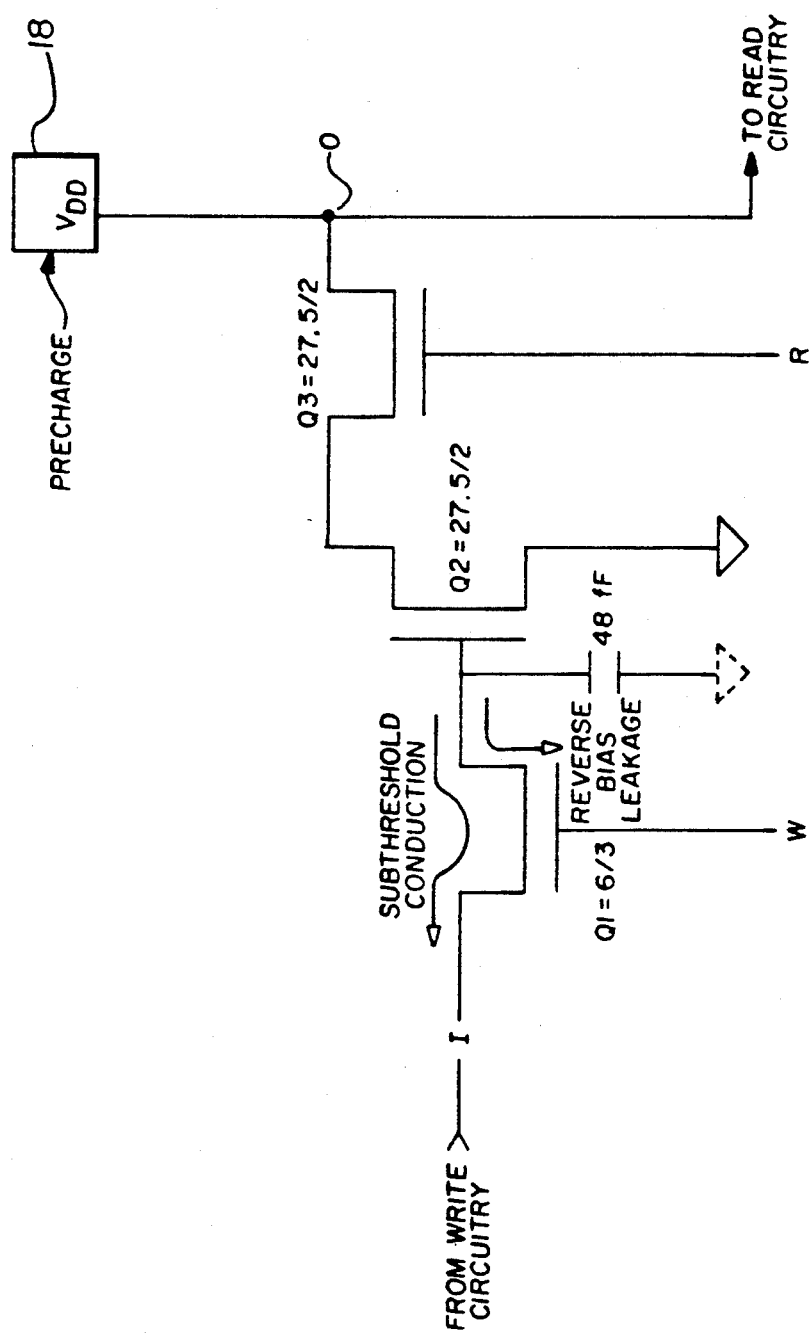
FIG. 2 illustrates a three-transistor DRAM cell employed in the FIFO architecture illustrated in FIG. 1.

As mentioned above, each of the word storage locations 16 include a plurality of memory cells. Preferably, the memory cells are formed of a three-transistor DRAM cell with separate data-in (I), data-out (O), read (R), and write (W) lines as illustrated in FIG. 2. The data-out line is connected to pre-charge circuitry 18 and to the output data bit-line of the FIFO via read circuitry 24. The data-in line is connected to the input data bit-line of the FIFO via write circuitry 23. The storage node for the memory cell is the gate of transistor Q2. The data present on the data-in line (I) is stored on the gate of Q2 when the write line W is asserted. The data-out line (O) is precharged high (logic "1") and is evaluated when the read line R is asserted. If a logic "1" was stored on the gate of Q2, the data-out line gets discharged through Q2 and Q3 to ground (GND), whereas if a logic "0" was stored the data-out line remains high.

Figure 3:
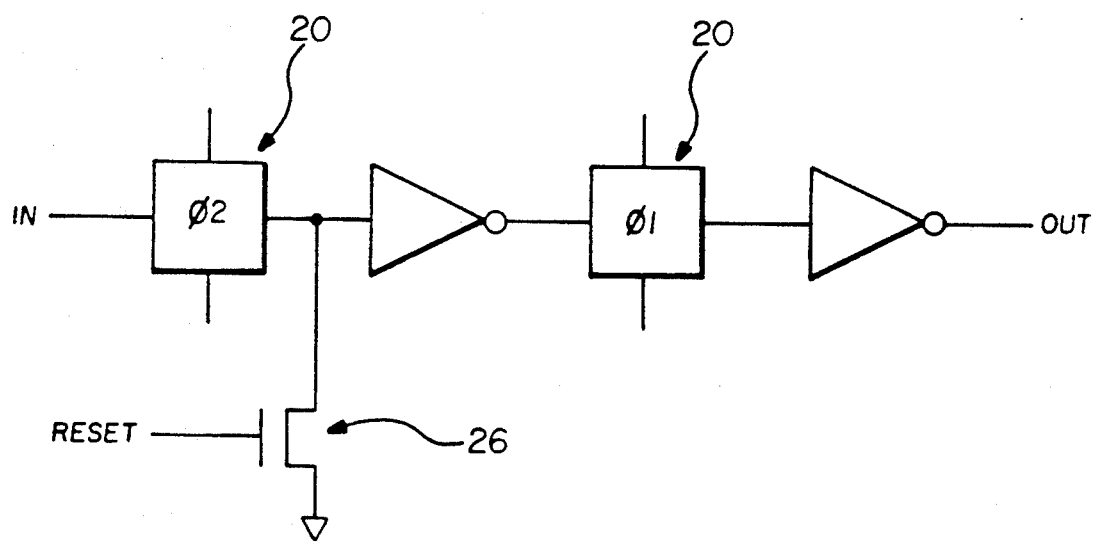
FIG. 3 illustrates the structure of a one bit resettable shift register employed in the pointer unit of the FIFO illustrated in FIG. 1.

FIG. 3 illustrates the basic structure of the shift-registers 14 employed in the pointer unit 10. Each shift register employs CMOS transmission gates 20 to latch and pass data received on the input line of the shift-register to the output line of the shift register dynamically. A clock generator 22 (shown in FIG. 1) is employed to generate $\phi 1$ and $\phi 2$ clock pulses, as well as their complements $\phi 1N$ and $\phi 2N$, to clock the operation of the CMOS transmission gates 20 (a transmission gate with $\phi 1$ indicates it is open when $\phi 1$ is high and closed when $\phi 1$ is low). The CMOS transmission gates are also employed in the structure of the write circuitry 23 and the read circuitry 24 that are respectively coupled to the input data bit-lines and output data bit-lines of the FIFO (See FIG. 1). A reset transistor 26 is provided to reset the output of the shift registers 16 to a logical "0". The purpose of the reset transistor 26 will be described in greater detail below.

In operation, the pointer unit 10 addresses the read enable and write enable lines to permit data to be sequentially stored in the word storage locations 16 of the storage unit 12 via the input data bit-lines and then sequentially read or sensed from the storage unit 12 using the output data bit-lines. A start pulse in the form of a logical "1" is supplied to the pointer unit 10 via the START control line to begin the addressing operation. The logical "1" then travels through each of the shift-registers 16, as clocking pulses are supplied by the clock generator 22, thereby sequentially activating the read and write enable lines.

A more detailed explanation will be provided using the following notation: Pi is the ith word storage location 14 of the storage unit 12, where i=1-720; the input data is denoted by Ii; and Ri and Wi indicate particular read and write operations. The following read and write operations are enabled as the "travelling 1" passes through the pointer unit 10. At the beginning of operation, the data present in the first word storage location, P1, is read from the storage unit 12 and supplied to the output data bit-lines (R1,W0), new data, I1, is written into P1 and the data at location P2 is read out at the next clock cycle (R2,W1). The simultaneous reading of a word storage location and writing of a previous word storage location continues until the last word storage location is reached. At that point, the last new data value, I720, is written (W720) into P720. The read/write sequence is therefore: (R1), (R2,W1), (R3,W2) . . . (R720,W719), (W720). Thus, the first data written to the storage unit 12 in a first operation is also the first data read out from the storage unit 12 in a subsequent operation.

The length of the FIFO can be varied by the application of a reset pulse to a reset line (RESET) that is connected to the reset transistor of each shift-register 16. Application of the reset pulse in effect wipes out the travelling 1 from the pointer unit 10 thereby stopping the addressing of the word storage locations 14. For example, the reset line is activated after the travelling 1 is output by shift-register (i+1), where (i) is the number of word storage locations to be addressed.

Figure 4:
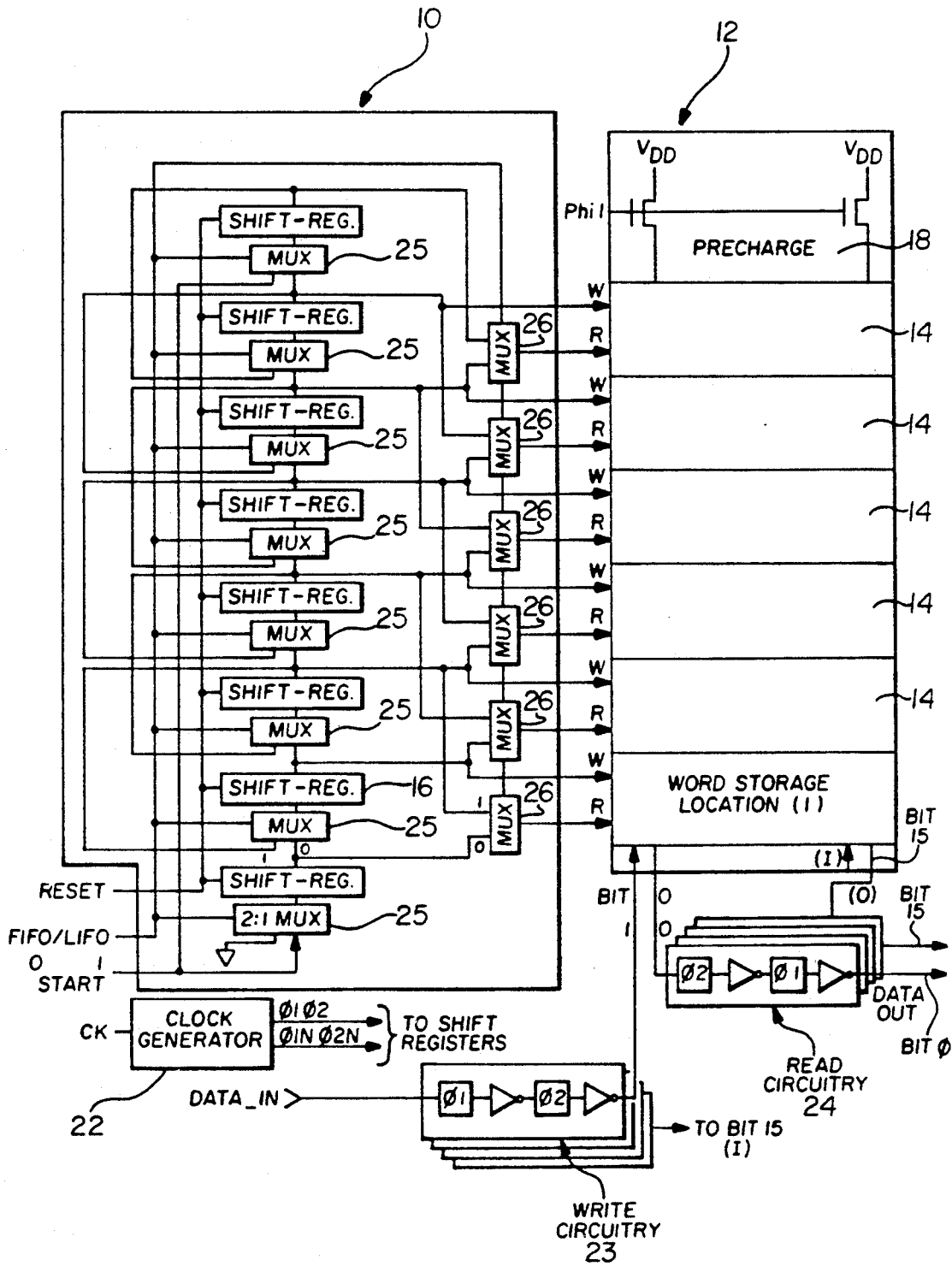
FIG. 4 is a simplified schematic diagram of a FIFO/LIFO device in accordance with the present invention.

The basic architecture of the above-described FIFO can be modified as illustrated FIG. 4 to operate as a FIFO/LIFO or a stack. The FIFO/LIFO architecture requires that one additional shift-register be provided in the pointer unit 10, i.e., the FIFO architecture requires a total of (N+1) shift-registers to address a total of (N) word storage locations 14 and the FIFO/LIFO architecture requires a total of (N+2) shift-registers 16. Shift multiplexers 25 and read multiplexers 26 (or suitable enabling circuitry) are respectively provided to multiplex the input line of each of the shift-registers 16 of the pointer unit 10 and the read enable lines coupled to the storage unit 12.

Basically, the shift multiplexers 25 select either the output of the preceding shift-register (i−1) for FIFO operation or the output of a pointer offset shift-register—which in this case is a successive shift-register (i+1)—for LIFO operation as the input to a given shift-register (i), where (i) indicates the position of a given shift-register within the pointer unit 10 starting from the bottom to the top as viewed in FIG. 4. Each read multiplexer 26 selectively couples either the output of a corresponding shift-register (i) for FIFO operation or the output of a read offset shift-register—which in this case is a shift-register (i+2) located two positions further along the length of the pointer unit 10—for LIFO operation to a read enable line of a corresponding word storage location (i). The two exceptions to the basic structure outlined above is that the inputs to the first shift multiplexer are connected to ground and to the START control line, and the inputs to the last shift multiplexer are connected to the START control line and the output line of the preceding shift-register. The shift and read multiplexers 25 and 26 are controlled by an external select line FIFO/LIFO which is held at a logic low level "0" for FIFO operation and a logic high level "1" for LIFO operation.

For example, when FIFO operation is selected, the START signal is applied to the first shift-register (1) of the pointer unit 10 and the shift and read multiplexers 25 and 26 are set so that the storage unit 12 is addressed in the same manner as described above with respect to the FIFO illustrated in FIG. 1. When LIFO operation is selected, however, the start pulse or travelling "1" applied to the START line is supplied to the last shift-register first. The output of the last shift register is coupled to the read enable line of the last word storage location and to the selected input of the shift multiplexer unit that controls the input to the preceding shift-register, wherein the output of the last shift-register is supplied as an input to the preceding shift register. The output of the preceding shift register is coupled to the write enable line of the last word storage location and to the selected input of the read multiplexer unit that controls the read enable line of a preceding word storage location, wherein the output of the preceding shift register is supplied to the write enable line of the last storage location and the read enable line of the preceding word storage location. The travelling "1" continues to propagate downward through the shift-registers 16 of the pointer unit 10, until the output of the third shift-register (3) is supplied to the read enable line of the first word storage location. Thus, the travelling "1" propagates through the pointer unit 10 in the LIFO mode of operation in the opposite direction than the propagation direction in the FIFO mode of operation, and the data is read from the word storage locations 14 in the LIFO mode of operation in the opposite order as it was stored in the FIFO mode of operation.

Programmability of line length in the LIFO mode of operation is accomplished through a variety of techniques. For example, if a few cycles of delay is required between the FIFO mode of operation and the LIFO mode of operation, the device is clocked in the FIFO mode for ½ the number of required delay cycles before switching to LIFO operation. Thus, the travelling "1" continues to travel up the pointer unit 10 for half of the required delay and is then reversed and travels down the pointer unit 10 for the other half of the required delay. Invalid or "garbage" data is written into and read from the storage locations addressed during the delay period. If a long delay is required, the RESET line is used to reset the shift-registers 16 at the appropriate point during FIFO operation. The initiation of LIFO operation is timed so that a start pulse supplied to the last shift multiplexer prior to the time when valid data is required, allowing time for the pulse to be shifted down the pointer unit 10 to point where the last data word was stored. If no delay is required, the read and write multiplexers can simply be switched from the FIFO mode of operation to the LIFO mode of operation when the desired line length is reached. In such a case, it would be desirable to provide separate FIFO/LIFO control lines to the read and write multiplexers to insure their proper operation, as timing problems may be incurred using one control line depending on the particular circuit design.

The ability to switch between FIFO and LIFO modes of operation permits the basic architecture to be employed as a stack. Data can be written to the stack in the FIFO mode and then retrieved to any depth in the LIFO mode. It would be desirable to employ static storage devices in the storage unit 12 in such a case, as it may be difficult to provide proper refresh of DRAMs during stack operations due to timing limitations.

The basic architecture described above can also be used to perform other transpose operations including matrix transpose operations that are particularly useful in image processing applications. For example, a one dimensional transform is first performed on the rows of data in a matrix and then another one dimensional transform is performed on the columns of a matrix in order to accomplish two dimensional orthogonal transforms (e.g. Fourier transforms). The basic FIFO/LIFO architecture can be modified to store the matrix data row by row and to read the matrix data column by column, by simply changing the inputs provided to the shift and read multiplexing units 25 and 26. More specifically, matrix transpose operations can be performed by switching between a first operating mode that is equivalent to the sequential FIFO operation described above and a second operating mode, wherein the inputs to the multiplexing units are selected from different offset shift-registers than the FIFO/LIFO illustrated in FIG. 4 in order to read data out in a sequence that corresponds to the columns of a matrix.

Figure 5:
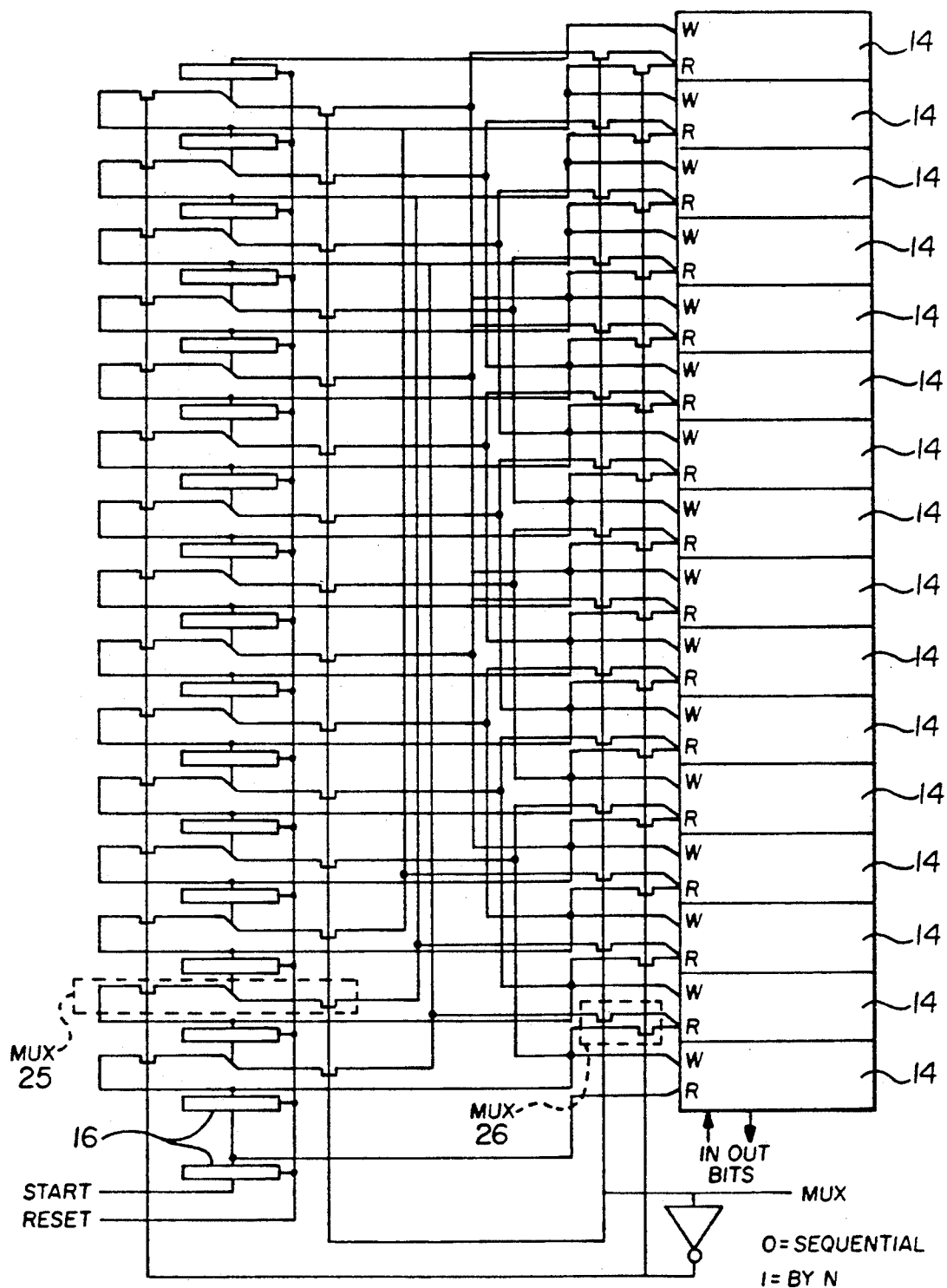
FIG. 5 is a simplified schematic diagram of a matrix transpose RAM device in accordance with the present invention.

A modified FIFO/LIFO device, hereinafter referred to as a transpose RAM (TRAM), is illustrated in FIG. 5. The basic structure of the TRAM is equivalent to the FIFO/LIFO illustrated in FIG. 4. The pointer unit 10 of the TRAM, however, is required to have only one more shift-register 16 than the number of word storage locations in the storage unit 12. The shift multiplexers 25 and read multiplexers 26 are illustrated as two-transistor multiplexing devices, with the transistors being activated when a logic "1" is applied to their gates. In the illustrated example, the TRAM is configured to transpose a 4×4 row and column matrix of data words. Specifically, the inputs to the shift multiplexers 25 and the read multiplexers 26 are configured so that in a first operating mode (when the multiplexer control line MUX is a logic "0") data is sequentially stored and read from the word storage locations 14, and in a second operating mode (when the MUX control line is a logic "1") data is stored and read from the word storage locations 14 in a sequence that matches the columns of the 4×4 matrix as will be described in greater detail with reference to FIG. 6.

Figure 6:
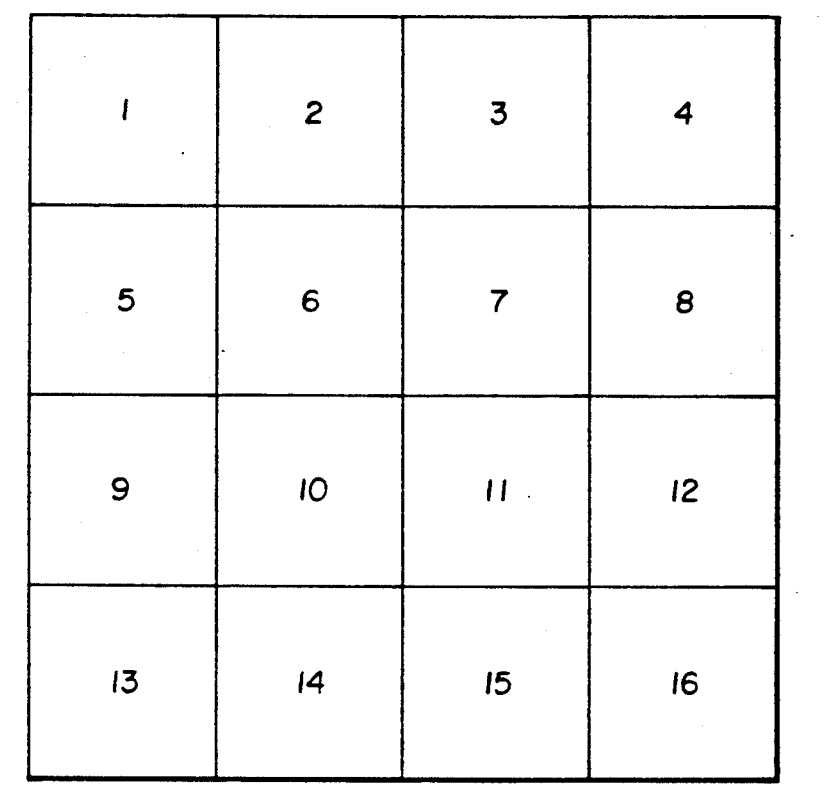

FIG. 6 illustrates a 4×4 matrix having sixteen data words. A transpose operation is carried out by supplying the data words row by row (1, 2, 3, 4, 5 ... 16) to the TRAM in the first operating mode (MUX=0). Thus, the sixteen data words are sequentially stored in the word storage locations 14. In order to perform the transpose operation, the data words must be retrieved from the word storage locations 14 in a column by column fashion, i.e., the data words must be read out 1, 5, 9, 13, 2, 6, 10, 14, 3 ... 16. The shift and read multiplexer units 25 and 26 are switched to the second operating mode by asserting a logic "1" level on the MUX control line. In the second operating mode, the shift and read multiplexer units 25 and 26 configure the inputs to the shift-registers 16 and the read enable lines to read out the data words in the column by column pattern.

For example, A START pulse is supplied to the first shift-register and the read enable line of the first storage location is addressed at the first clock cycle. The output of the first shift-register is connected to the second shift-register, whose outputs are connected to the read enable line of the fifth word storage location and the write enable line of the first word storage locations, resulting in the fifth data word being read from the fifth word storage location and the first data word of a second matrix being written in the first storage location if desired. The output of the second shift register is connected to the input of the sixth shift register, whose outputs are connected to the read enable line of the ninth word storage location and the write enable line of the fifth word storage location. The travelling "1" continues to propagate through the pointer unit 10 until all of the data words from the first data matrix have been retrieved and data words from a second data matrix have been written into the word storage locations.

The above operation is illustrated in Table 1 below using the following notation: Ri indicates the enabled read line; Wi indicates the enable write line; M1(n) indicates the nth data word of a first matrix; and M2(n) indicates the nth data word of a second matrix. Thus, R1-M1(1) would indicate the first read enable line is activated to read the first data word corresponding to a first matrix.

TABLE 1

| Clock Cycle | Read Operation | Write Operation |
|---|---|---|
| 1 | R1-M1(1) | |
| 2 | R5-M1(5) | W1-M2(1) |
| 3 | R9-M1(9) | W5-M2(2) |
| 4 | R13-M1(13) | W9-M2(3) |
| 5 | R2-M1(2) | W13-M2(4) |
| 6 | R6-M1(6) | W2-M2(5) |
| 7 | R10-M1(10) | W6-M2(6) |
| 8 | R14-M1(14) | W10-M2(7) |
| 9 | R3-M1(3) | W14-M2(8) |
| 10 | R7-M1(7) | W3-M2(9) |
| 11 | R11-M1(11) | W7-M2(10) |
| 12 | R15-M1(15) | W11-M2(11) |
| 13 | R4-M1(4) | W15-M2(12) |
| 14 | R8-M1(8) | W4-M2(13) |
| 15 | R12-M1(12) | W8-M2(14) |
| 16 | R16-M1(16) | W12-M2(15) |
| 17 | | W16-M2(16) |

As is readily apparent from Table 1, the data words for the second matrix are in fact transposed as they are written into the word storage locations 14, i.e., the first word storage location contains the first data word, the second word storage location contains the fifth data word, the third word storage location contains the ninth data word, etc. Thus, the word storage locations 14 can now be sequentially addressed in the first mode of operation to read out the transposed data for the second matrix.

The invention has been described with particular reference to certain preferred embodiments thereof. It will be understood, however, that modifications and variations can be made within the spirit and scope of the appended claims. For example, the size of the word storage locations can be varied, the type of memory cells employed can be varied, and the specific layout and arrangement of the pointer unit and storage unit can be varied as long as the addressing scheme remains the same. The offset can also be varied in the transpose mode of operation to fit any desired size matrix. Other modifications and variations are possible within the scope of the appended claims.

What is claimed is:

1. An apparatus comprising:
a storage unit including a plurality of word storage locations, each of said word storage locations being coupled to a corresponding read enable line and write enable line;
pointer means for addressing said read enable lines and said write enable lines to permit data to be written into said word storage locations in a first sequence in a first operating mode and to be retrieved from said word storage locations in a second sequence that is transposed from said first sequence in a second operating mode, said pointer means comprising a plurality of successive shift-registers each including an input line and an output line, a plurality of shift multiplexing units coupled to corresponding shift-registers of said shift-registers, and a plurality of read multiplexing unit coupled to corresponding read enable lines, each shift multiplexing unit selectively connecting the output line of a corresponding shift-register of said shift-registers coupled thereto to the input line of a successive shift-register of said shift-registers in said first operating mode and to the input line of a shift-register of said shift-registers that is offset from the corresponding shift register in said second operating mode, and each read multiplexer unit selectively connecting the corresponding read enable line coupled thereto to the output line of one shift-register of said shift registers in said first operating mode and to the output line of a shift-register of said shift-registers that is offset from said one shift-register in said second operating mode;
write circuitry means coupled to said storage unit for writing data to said plurality of word storage locations when their corresponding write enable lines are addressed by said pointer means;
read circuitry means for sensing data stored in said plurality of word storage locations when their corresponding read enable lines are addressed by said pointer means; and
a clock generator coupled to said pointer means;
wherein said pointer means selectively addresses said write enable lines in said first mode of operation to sequentially store row and column matrix data supplied by said write circuitry means matrix data row by matrix data row in said plurality of word storage locations, and selectively addresses said read enable lines in said second mode of operation to permit said read circuitry means to read said row and column matrix data matrix data column by matrix data column from said plurality of word storage locations.

2. An apparatus as claimed in claim 1, wherein said multiplexing means comprises a plurality of shift-registers including an input line and an output line, a plurality of shift multiplexing units corresponding to selected ones of said plurality of shift registers, and a plurality of read multiplexing units corresponding to said read enable lines.

3. An apparatus as claimed in claim 1 wherein said word storage locations including a plurality of memory cells, wherein corresponding memory cells from each of said word storage locations are connected to common data input lines and common data output lines of said apparatus.

4. An apparatus as claimed in claim 3, wherein said memory cells comprise DRAM cells.

5. An apparatus as claimed in claim 4, wherein said DRAM cells comprise three-transistor DRAM cells.

* * * * *